(12) United States Patent
Yabu et al.

(10) Patent No.: US 6,893,593 B2
(45) Date of Patent: May 17, 2005

(54) RESIN FORMED ARTICLE AND METHOD FOR PRODUCTION THEREOF

(75) Inventors: Sadao Yabu, Kishiwada (JP); Takashi Nakai, Sakai (JP); Kazushige Uchida, Kadoma (JP); Hidemi Ibi, Kitakatsuragi-gun (JP)

(73) Assignee: Matsushita Electric Works, Ltd., Kadoma (JP)

(*) Notice: Subject to any disclaimer, the term of this patent is extended or adjusted under 35 U.S.C. 154(b) by 0 days.

(21) Appl. No.: 10/381,881

(22) PCT Filed: Jun. 24, 2002

(86) PCT No.: PCT/JP02/06306

§ 371 (c)(1),
(2), (4) Date: Mar. 31, 2003

(87) PCT Pub. No.: WO03/000482

PCT Pub. Date: Jan. 3, 2003

(65) Prior Publication Data

US 2004/0043222 A1 Mar. 4, 2004

(30) Foreign Application Priority Data

Jun. 26, 2001 (JP) .................................. 2001-193154
Dec. 25, 2001 (JP) .................................. 2001-392235

(51) Int. Cl.$^7$ ............................ B29C 69/00; C08L 51/00
(52) U.S. Cl. .................... 264/211.12; 264/294; 525/70; 525/73; 525/77; 525/86
(58) Field of Search ...................... 264/211.12, 294; 525/70, 73, 77, 86

(56) References Cited

U.S. PATENT DOCUMENTS 3,658,947 A    4/1972   Ito et al.
5,006,382 A  * 4/1991   Squire .................... 428/35.7
5,648,424 A  * 7/1997   Miwa et al. ............. 525/92 D

FOREIGN PATENT DOCUMENTS

| JP | 35-18194 | 12/1960 | | |
|---|---|---|---|---|
| JP | 46-7479 | 2/1971 | | |
| JP | 48-12346 | 2/1973 | | |
| JP | 49-13261 | 2/1974 | | |
| JP | 50-24352 | 8/1975 | | |
| JP | 50-140560 | 11/1975 | | |
| JP | 53-144975 | 12/1978 | | |
| JP | 57-115445 | 7/1982 | | |
| JP | 62-68805 | 3/1987 | | |
| JP | 62-144925 | 6/1987 | | |
| JP | 63-25025 | 2/1988 | | |
| JP | 63-114628 | 5/1988 | | |
| JP | 63114628 A | * 5/1988 | .......... | B29C/55/18 |
| JP | 3-163058 | 7/1991 | | |
| JP | 4-214323 | 8/1992 | | |
| JP | 6-335966 | 12/1994 | | |
| JP | 10-67868 | 3/1998 | | |
| JP | 10-298400 | 11/1998 | | |
| JP | 11-80557 | 3/1999 | | |
| JP | 2001-139765 | 5/2001 | | |

* cited by examiner

Primary Examiner—Margaret G. Moore
Assistant Examiner—Marc S Zimmer
(74) Attorney, Agent, or Firm—Oblon, Spivak, McClelland, Maier & Neustadt, P.C.

(57) ABSTRACT

A resin molded article is produced by performing extrusion molding of a thermoplastic amorphous resin containing a dispersion phase, and then rolling it. According to a molecular orientation associated with an elongation of the dispersion phase in the rolling direction, it is possible to provide the resin molded article having an increased elastic modulus and a reduced coefficient of linear expansion.

12 Claims, 4 Drawing Sheets

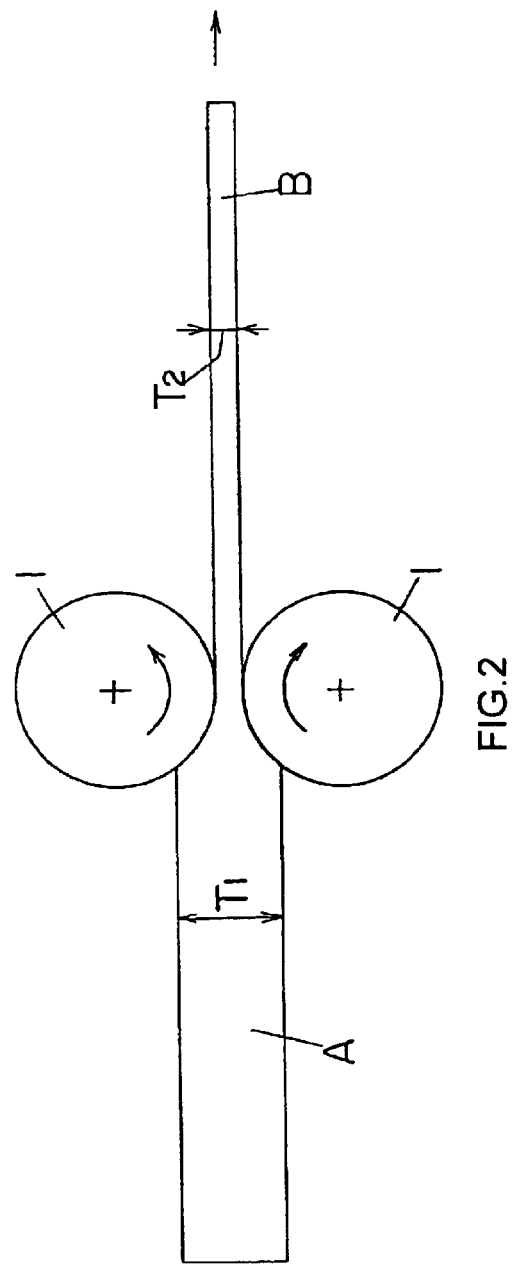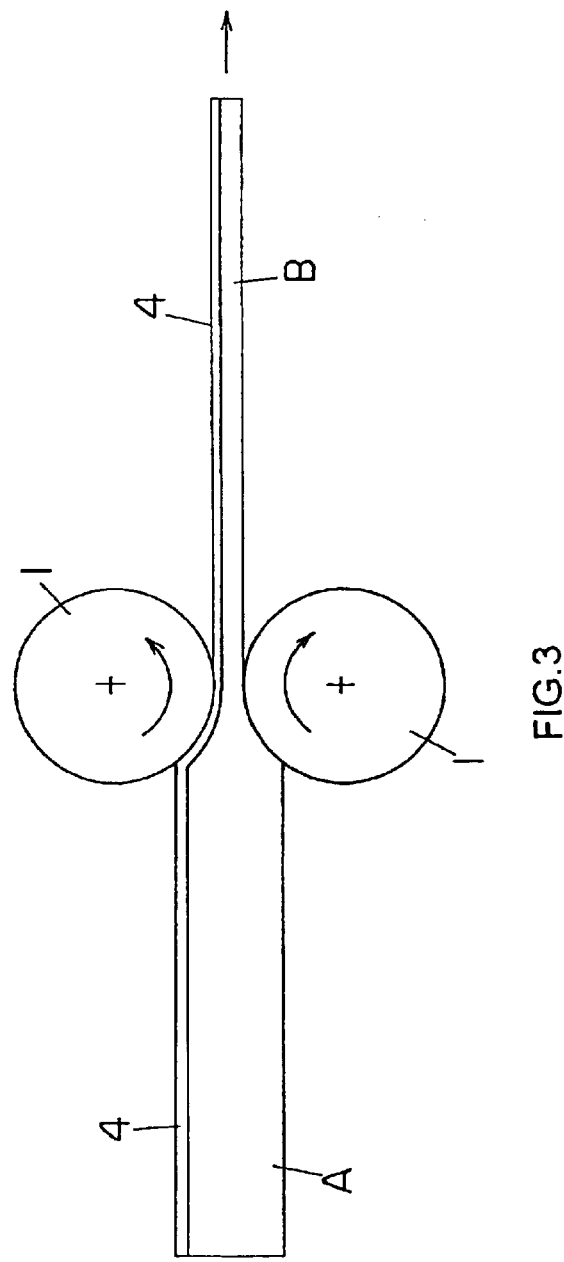

RESIN FORMED ARTICLE AND METHOD FOR PRODUCTION THEREOF

TECHNICAL FIELD

The present invention relates to a resin molded article obtained by molding a thermoplastic amorphous resin, and a method of producing the same.

BACKGROUND ART

In the past, thermoplastic amorphous resins such as ABS resin (acrylonitrile-butadiene-styrene copolymer resin) and AAS resin (acrylonitrile-acrylic rubber-styrene copolymer resin) have been utilized in various applications of automobile parts, electric appliances, housing members and so on.

In general, these ABS and AAS resins of the thermoplastic amorphous resins are molded by extrusion molding, injection molding, vacuum molding and so on. The thus molded article has 1 to 2 GPa of elastic modulus and 8 to $10 \times 10^{-5}/°$C. of coefficient of linear expansion. However, in the case of molding the resin into an elongated shape to use a resultant molded article as, for example, a gutter, it is needed that the molded article has an increased elastic modulus and a reduced coefficient of linear expansion to ensure rigidity and dimensional stability thereof. In the above-described ranges of the elastic modulus and the coefficient of linear expansion, sufficient rigidity and dimension stability can not be achieved.

To improve the elastic modulus of the molded article obtained by molding the ABS or AAS resin and reduce the coefficient of linear expansion thereof, it has been performed in the past to add 10 to 30 parts by weight of a glass fiber with reference to 100 parts by weight of the resin. However, since the glass fiber of an inorganic material is mixed with the resin of an organic material, there is a problem that recycling of the molded article becomes difficult.

SUMMARY OF THE INVENTION

In consideration of the above-described points, a purpose of the present invention is to provide a resin molded article having a higher elastic modulus and a lower coefficient of linear expansion as compared with conventional ones. That is, the resin molded article of the present invention is produced by performing extrusion molding of the thermoplastic amorphous resin and then rolling. In particular, when the rolling is performed after the extrusion molding of the thermoplastic amorphous resin containing a dispersion phase, the dispersion phase is drawn out in the rolling direction. As a result, according to a molecular orientation of the dispersion phase in the rolling direction, it is possible to provide the resin molded article having an increased elastic modulus and a reduced coefficient of linear expansion.

It is preferred that the thermoplastic amorphous resin is at least one of ABS resin and AAS resin.

It is preferred that the thermoplastic amorphous resin is an ABS resin containing 5 to 30 wt % of polybutadiene. In this case, it is possible to minimize shrinkage when the resin molded article is heated, to thereby improve heat resistance without deteriorating shock resistance of the resin molded article.

It is preferred that the thermoplastic amorphous resin is an ABS resin containing a component of increasing its glass transition temperature. Since a starting temperature of thermal deformation of the resin molded article is shifted to the high-temperature side by increasing the glass transition temperature, it is possible to minimize shrinkage when the resin molded article is heated, to thereby improve the heat resistance.

It is preferred that the thermoplastic amorphous resin is an ABS resin containing 5 to 20 wt % of N-phenylmaleimide as the component of increasing the glass transition temperature. Since the glass transition temperature is increased by the addition of N-phenylmaleimide, so that the starting temperature of thermal deformation of the resin molded article is shifted to the high-temperature side, it is possible to minimize shrinkage when the resin molded article is heated, to thereby improve the heat resistance. In addition, it is preferred that N-phenylmaleimide is uniformly dispersed in a dispersion medium of a copolymer of acrylonitrile and styrene. It is possible to further improve the effect of increasing the glass transition temperature by the addition of N-phenylmaleimide.

It is preferred that the thermoplastic amorphous resin is an ABS resin containing 5 to 20 wt % of α-methylstyrene as the component of increasing the glass transition temperature. In this case, since the glass transition temperature is increased by the addition of α-methylstyrene, so that the starting temperature of thermal deformation of the resin molded article is shifted to the high-temperature side, it is possible to minimize shrinkage when the resin molded article is heated, to thereby improve the heat resistance. In particular, it is preferred that α-methylstyrene is uniformly dispersed in a dispersion medium of a copolymer of acrylonitrile and styrene. It is possible to further improve the effect of increasing the glass transition temperature by the addition of α-methylstyrene.

It is preferred that the thermoplastic amorphous resin is an ABS resin alloyed with polycarbonate. The polycarbonate alloying increases the glass transition temperature, so that the starting temperature of thermal deformation of the resin molded article is shifted to the high-temperature side. Therefore, it is possible to minimize shrinkage when the resin molded article is heated, to thereby improve the heat resistance.

In the case of using the thermoplastic amorphous resin containing the dispersion phase, it is preferred that a maximum length in the rolling direction of the dispersion phase after the rolling is two times or more of a maximum thickness in a direction substantially perpendicular to the rolling direction of the dispersion phase after the rolling. According to an increased molecular orientation, it is possible to further increase the effects of improving the elastic modulus and reducing the coefficient of linear expansion.

It is preferred that the resin molded article has a thickness of 0.5 to 10 mm. In this case, the resin molded article is suitable for various applications of automobile parts, electric appliances, housing members and so on.

It is preferred that the resin molded article after the rolling has an elastic modulus of 2.5 GPa or more. It is possible to provide the resin molded article having a higher rigidity.

It is also preferred that the resin molded article after rolling has a coefficient of linear expansion of 2 to $6 \times 10^{-5}/°$C. It is possible to provide the resin molded article having excellent dimension stability.

A further object of the present invention is to provide a method of producing a molded article of a thermoplastic amorphous resin having a higher elastic modulus and a lower coefficient of linear expansion as compared with conventional ones. That is, this method comprises the steps of performing extrusion molding of the thermoplastic amorphous resin and then rolling. In particular, when the rolling is performed after the extrusion molding of the thermoplastic amorphous resin containing a dispersion phase, the dispersion phase is drawn out in the rolling direction. As a result, according to a molecular orientation of the dispersion phase in the rolling direction, it is possible to provide a resin molded article having an increased elastic modulus and a reduced coefficient of linear expansion.

After the extrusion molding, it is preferred that the thermoplastic amorphous resin is rolled at a rolling magnification of 1.2 to 5 times. By increasing the molecular orientation, it is possible to achieve higher effects of improving the elastic modulus and reducing the coefficient of linear expansion.

After the extrusion molding, it is preferred that the thermoplastic amorphous resin heated at a temperature between a temperature determined by subtracting 30° C. from its glass transition temperature and a temperature determined by adding 60° C. to the glass transition temperature is rolled by use of a reduction roll heated at a temperature between the glass transition temperature and a temperature determined by subtracting 50° C. from the glass transition temperature.

In addition, after the rolling of the thermoplastic amorphous resin containing the dispersion phase, it is preferred to perform a heat treatment at a temperature of 70 to 100° C.

When the thermoplastic amorphous resin containing the dispersion phase is an ABS resin, it is preferred that an acrylic resin is laminated on a surface of the ABS resin, and then the extrusion molding is performed. In this case, the acrylic resin densified by the rolling improves weathering resistance of the ABS resin. In particular, it is preferred to use an AAS resin as the acrylic resin. The weathering resistance of the ABS resin is improved by the rolled AAS resin. In addition, an increase in elastic modulus and a reduction in coefficient of linear expansion of the AAS resin can be achieved by the rolling.

It is preferred that a heat treatment is performed at a temperature between its glass transition temperature and a temperature determined by subtracting 30° C. from the glass transition temperature under a condition that the resin molded article is secured to prevent dimensional change. In this case, it is preferred to perform the heat treatment for 2 minutes or more. It is possible to improve the dimension stability of the resin molded article, and also minimize shrinkage when the resin molded article is heated, to thereby increase the heat resistance. Moreover, it is possible to prevent the occurrence of a deformation such as warping or waving of the resin molded article.

It is preferred that the thermoplastic amorphous resin is selected from an ABS resin, AAS resin, HI-PS resin, and polycarbonate resin. In particular, it is preferred to use at least one of the ABS and AAS resins as the thermoplastic amorphous resin.

In the case of using the ABS resin, it is preferred to use an ABS resin containing at least one of N-phenylmaleimide and α-methylstyrene, or an ABS resin alloyed with polycarbonate. Additionally, it is preferred that the ABS resin contains 5 to 30 wt % of a polybutadiene component.

BRIEF EXPLANATION OF THE DRAWINGS

FIG. 2 is a front view showing a rolling step according to the preferred embodiment of the present invention;

FIG. 3 is a front view of the rolling step according to another preferred embodiment of the present invention;

BEST MODE FOR CARRYING OUT THE INVENTION

As described above, a resin molded article of the present invention is produced by performing extrusion molding of a thermoplastic amorphous resin and then rolling. As the thermoplastic amorphous resin, it is preferred to use an ABS resin or an AAS resin. The ABS resin has a resin structure that a copolymer of acrylonitrile and styrene is a matrix phase (dispersion medium), and polybutadiene is dispersed as a dispersion phase in this matrix. On the other hand, the AAS resin has a resin structure that the copolymer of acrylonitrile and styrene is the matrix phase (dispersion medium), and an acrylic rubber is dispersed as the dispersion phase in this matrix. One of the ABS resin and the AAS resin can be used by itself. Alternatively, both of them may be blended.

In the present invention, a primary molded article A obtained by the extrusion molding of this thermoplastic amorphous resin is rolled in its longitudinal direction to obtain a resin molded article B. As shown in FIG. 2, the rolling is performed by allowing the primary molded article A to pass through a clearance between a pair of reduction rolls 1. At this time, the primary molded article A is drawn out by reducing its thickness while substantially maintaining its width.

Figure 1A:
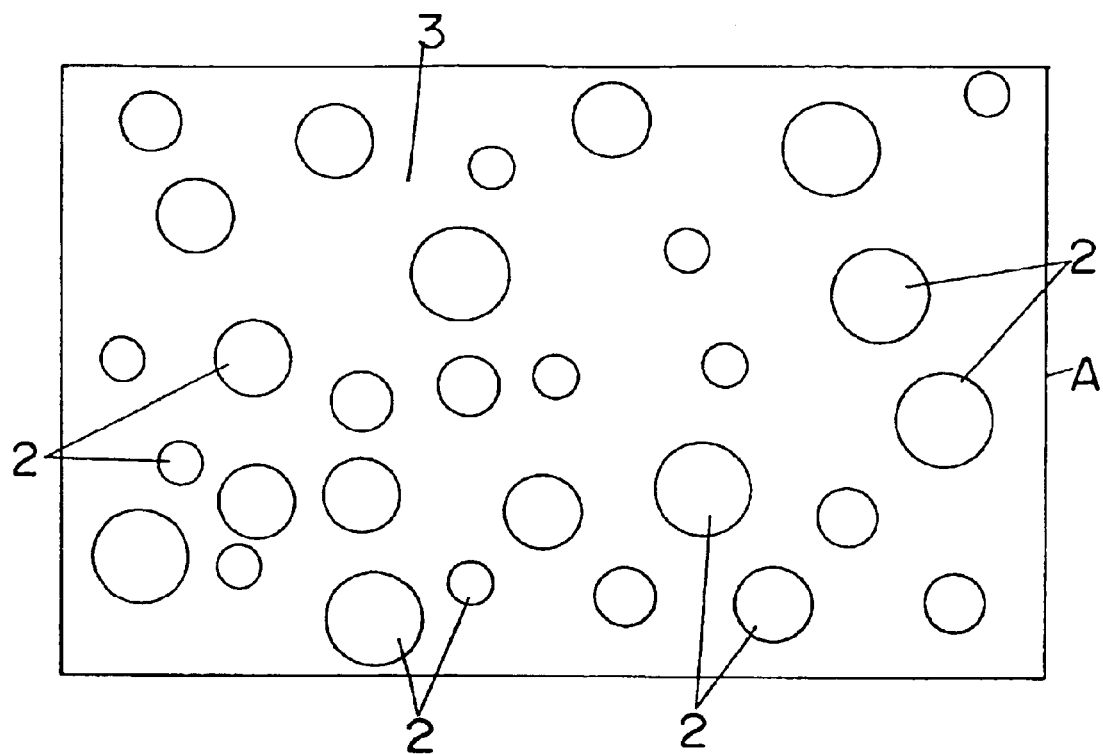
FIGS. 1A and 1B are respectively schematic views illustrating resin structures before and after rolling according to a preferred embodiment of the present invention.
Figure 1B:
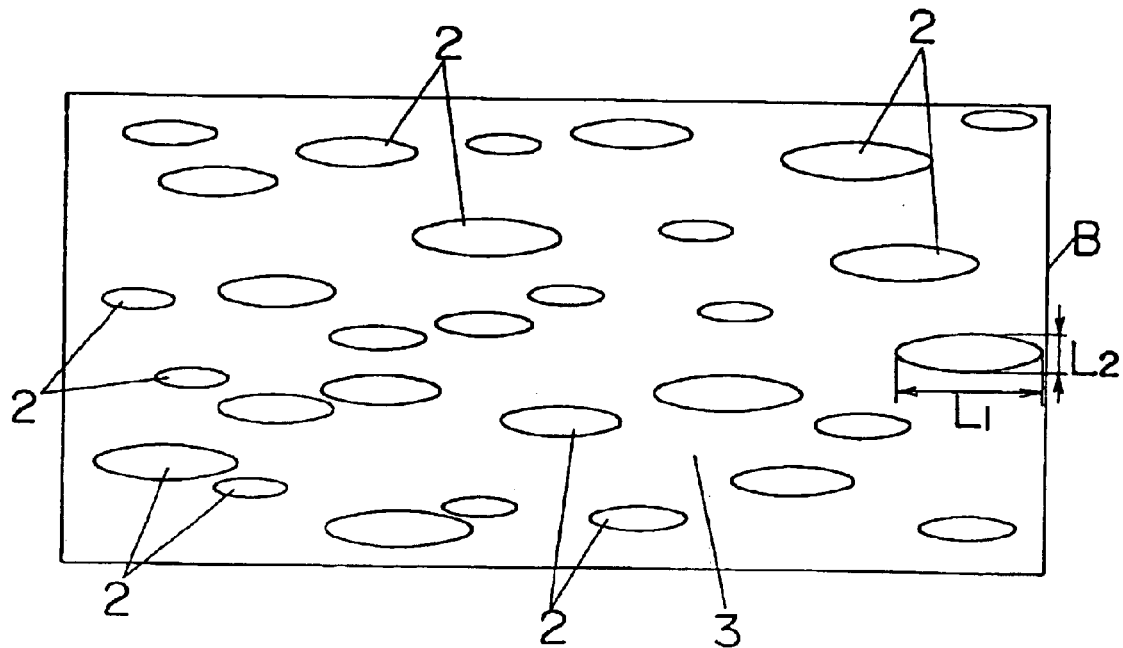

In the primary molded article A obtained by extrusion molding of the thermoplastic amorphous resin containing the above dispersion phase, there is no molecular orientation of the resin. That is, as shown in FIG. 1A, the dispersion phase 2 dispersed in the matrix 3 is of a spherical shape. However, by rolling this primary molded article A with the reduction rolls 1, the dispersion phase 2 and the matrix 3 are drawn out in the rolling direction, so that the dispersion phase 2 deforms to become a planular shape in the thickness direction and an elongated elliptical shape in the rolling direction, as shown in FIG. 1B. That is, when the dispersion phase 2 and the matrix 3 are drawn out by the rolling, a molecular orientation in the rolling direction is induced in the resin molded article B, so that an improvement of elastic modulus in this direction and a reduction in coefficient of linear expansion are achieved. In the present invention, the rolling direction of the resin molded article B means a direction that the reduction rolls 1 feed the primary molded article, which is also defined as a direction perpendicular to the thickness direction of the resin molded article B.

It is preferred that the resin molded article B obtained by the rolling has an elastic modulus of 2.5 GPa or more and a coefficient of linear expansion of 2 to $6 \times 10^{-5}/°$ C. When the elastic modulus is less than 2.5 GPa, an elongated article of the resin molded article B may become insufficient in rigidity. In such a case, a deformation of the molded article will easily happen. The upper limit of elastic modulus is not set. However, when the elastic modulus is too high, there is a fear of lowering toughness. Therefore, in practical use, the upper limit is approximately 10 GPa. In addition, when the coefficient of linear expansion exceeds $6 \times 10^{-5}/°$ C., the elongated article of the resin molded article B may become poor in dimensional stability because of large expansion and contraction caused by a temperature change. Therefore, a lower coefficient of linear expansion is preferred. For example, a practical lower limit may be $2 \times 10^{-5}/°$ C.

It is preferred that the dispersion phase 2 having the ellipse shape of the resin molded article B satisfies a condition that a maximum length ($L_1$) in the rolling direction of the dispersion phase is more than two times ($L_1/L_2>2$) of a maximum length ($L_2$) in the thickness direction of the dispersion phase, as shown in FIG. 1B. In this case, improvements of the elastic modulus and the coefficient of linear expansion can be effectively achieved by the rolling. Therefore, a larger value of $L_1/L_2$ is preferred. For example, a practical upper limit is approximately 5.

As shown in FIG. 2, when the rolling is performed by allowing the primary molded article A obtained by extrusion molding of the thermoplastic amorphous resin to pass through the clearance between the reduction rolls 1, it is preferred that the primary molded article A is heated at a plastic-deformation temperature of the resin. In this case, it is preferred that the heating temperature of the primary molded article A is set within a temperature range between a temperature (glass transition temperature $-30°$ C.) determined by subtracting 30° C. from a glass transition temperature of the resin and a temperature (glass transition temperature $+60°$ C.) determined by adding 60° C. to the glass transition temperature of the resin. When the temperature of the primary molded article A is lower than this temperature range, it may become difficult to roll the resin. In addition, discoloration to white may happen on a surface of the molded article during the rolling. On the contrary, when the temperature of the primary molded article A is higher than this temperature range, there is a fear that improvements of the elastic modulus and the coefficient of linear expansion can not be effectively achieved by the rolling.

In addition, it is not needed that both of the reduction rolls 1 are maintained at the same temperature. However, it is preferred that each of the reduction rolls 1 is set in a temperature range between the glass transition temperature of the resin of the primary molded article A and a temperature (glass transition temperature $-50°$ C.) determined by subtracting 50° C. from the glass transition temperature. When the temperature of the reduction roll 1 is smaller than the above temperature range, workability in rolling may deteriorate. In addition, discoloration to white may happen on a surface of the molded article. On the contrary, when the temperature of the reduction roll 1 is higher than the above temperature range, sufficient improvements of the elastic modulus and the coefficient of linear expansion may not be achieved by the rolling.

Moreover, when the above-described temperature is too high during the rolling, there is a fear that a plastic deformation of the resin easily happens by flowage, so that it becomes difficult to obtain a desired orientation of the drawn-out dispersion phase in the resin. On the other hand, when the temperature is too low, there is a fear that a stress induced in the resin by the rolling brings a fracture of the resin.

In the present invention, it is preferred to carry out a heat treatment of the resin molded article B after the rolling. In this case, it is preferred that a temperature of the heat treatment is determined by subtracting several tens of degrees from the glass transition temperature of the resin, and particularly set within a range of 70 to 100° C. Although the heating time is not limited, a time period between 2 minutes and approximately 1 hour is recommended. In addition, the heat treatment may be performed under a condition of applying a tensile stress to the resin molded article B in the rolling direction. By the heat treatment of the resin molded article B after the rolling, it is possible to further increase the elastic modulus of the resin molded article B, and reduce the coefficient of linear expansion. When the temperature of the heat treatment is less than 70° C., these effects of the heat treatment become lower. On the other hand, when the temperature of the heat treatment exceeds 100° C., a deformation of the resin molded article B comes into a problem.

As an example, the primary molded article A of an ABS resin was heated at the glass transition temperature of 110° C., and rolled by use of the reduction rolls 1 kept at 80° C. at a rolling magnification of 2.5 times, so that 2.5 mm of the thickness before the rolling became 1.0 mm of the thickness after the rolling. By this rolling step, an increase in elastic modulus and a reduction in coefficient of linear expansion of the resin molded article were achieved. Subsequently, a heat treatment was performed at 130° C. for 5 minutes. However, since the heat-treatment temperature is too high, the elastic modulus of this resin molded article B decreased to 2 GPa, and the coefficient of linear expansion thereof increased to $9 \times 10^{-5}/°$ C. In addition, the occurrence of an irregular surface was observed.

In the case of rolling the primary molded article A obtained by extrusion molding of the thermoplastic amorphous resin to obtain the resin molded article B, it is preferred that a rolling magnification, which is defined as a ratio (=T1/T2) of the thickness (T1) of the primary molded article A before the rolling and the thickness (T2) of the resin molded article B after the rolling, is determined within a range of 1.2 to 5 times. As shown in FIG. 2, when the primary molded article A is rolled by allowing it to pass through a clearance between the reduction rolls 1, the rolling magnification can be arbitrarily determined by setting a ratio of the thickness of the primary molded article A and the clearance between the reduction rolls 1.

As the rolling magnification is higher, effects of improving the elastic modulus and reducing the coefficient of linear expansion increases. Therefore, when the rolling magnification is less than 1.2 times, those effects may not be sufficiently achieved. On the other hand, even when an excessively high rolling magnification is set, the effects will be saturated. For example, when the rolling magnification exceeds 5 times, there is a possibility that the rolling step can not be normally finished because of the occurrence of cracks.

The resin molded article B obtained by the rolling preferably has a thickness of 0.5 mm to 10 mm. For various applications such as automobile parts, electric appliances, housing materials and so on, it is preferred that the thickness is 0.5 mm or more. When the thickness exceeds 10 mm, the application range will become narrow. As shown in FIG. 2, when passing the primary molded article A through the clearance between the reduction rolls 1, it is possible to obtain a desired thickness of the resin molded article B by adjusting the clearance between the reduction rolls 1.

In addition, when using a molded article of an ABS resin in the open air, it is preferred to coat a surface of the ABS resin with an acrylic resin to improve weathering resistance of the ABS resin. It can not be expected that a coating of the acrylic resin formed by painting or extrusion molding provides good weathering resistance. However, in the present invention, as shown in FIG. 3, since an acrylic-resin coating layer 4 is laminated on a surface of the primary molded article A of the ABS resin, and then this laminate is rolled by use of the reduction rolls 1 to obtain the resin molded article B, the acrylic-resin coating layer 4 is densified by the rolling, so that excellent weathering resistance can be achieved. As this acrylic-resin coating layer, polymethyl methacrylate resin (PMMA resin) or the like can be used. In particular, it is preferred to use an AAS resin because the elastic modulus and the coefficient of linear expansion can be effectively improved by rolling.

Figure 4A:
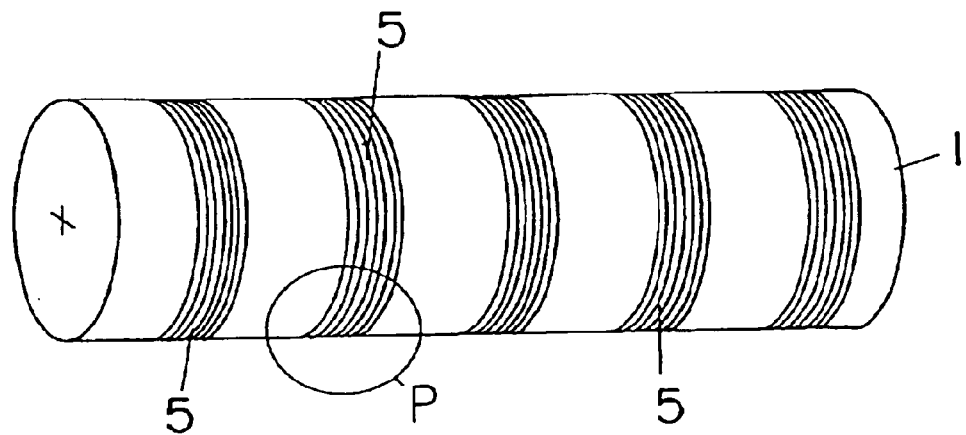
FIG. 4A is a perspective view of a reduction roll according to a further preferred embodiment of the present invention.
Figure 4B:
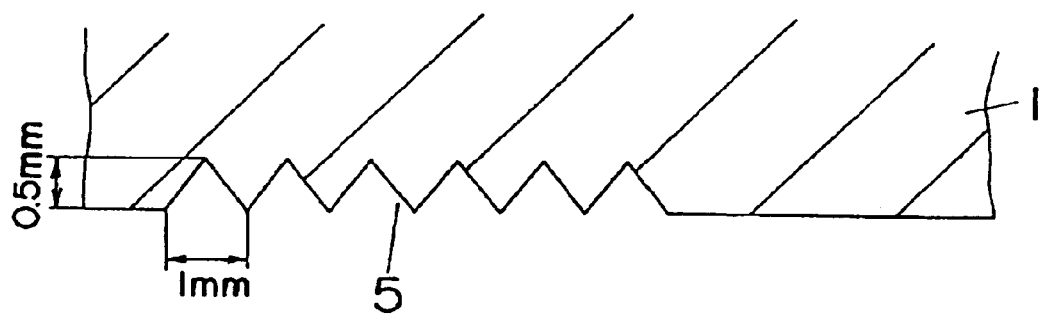
FIG. 4B is an enlarged cross-sectional view of a portion "P" of FIG. 4A.

In addition, when using the reduction roll 1 with a polished peripheral surface, it is possible to obtain the resin molded article having good shine. Moreover, when the peripheral surface of the reduction roll 1 has a fine concave and convex pattern 5, as shown in FIG. 4, it is possible to transfer the concave and convex pattern on a surface of the resin molded article B by rolling. In this case, at least one of the reduction rolls 1 may have the concave and convex pattern 5.

In the resin molded article B produced by using an ABS resin as the thermoplastic amorphous resin according to the method of the present invention, as shown in FIG. 1A, a spherical dispersion phase 2 of polybutadiene is dispersed in the matrix phase 3 of the ABS resin. As shown in FIG. 1B, a molecular orientation is induced in the rolling direction by the rolling to increase the elastic modulus and reduce the coefficient of linear expansion. By the way, when the resin molded article B is heated at a temperature of 50 to 80° C., the matrix phase 3 becomes soft, so that the deformed dispersion phase 2 of polybutadiene becomes easy to recover the original spherical shape. When a shrinkage caused by allowing the deformed dispersion phase 2 of polybutadiene to recover the original spherical shape is greater than a slight deformation caused by a thermal expansion of the matrix phase 3 and the dispersion phase 2 of polybutadiene, the resin molded article B contracts as a whole in the rolling direction.

To reduce a shrinkage caused by heating the resin molded article B and increase the heat resistance, it is preferred to use the ABS resin containing a small amount of polybutadiene. As the amount of polybutadiene decreases, an amount of the dispersion phase 2 of polybutadiene also decreases. Therefore, it is possible to reduce the shrinkage caused when the deformed dispersion phase of polybutadiene recovers the original spherical shape. As a result, this brings a reduction in shrinkage of the resin molded article B in the rolling direction. However, when the amount of polybutadiene is too small, the shock resistance of the ABS resin may lower. In the present invention, it is particularly preferred to use the ABS resin containing 5 to 30 wt % of polybutadiene.

In the present invention, to reduce the shrinkage caused by heating the resin molded article B, it is also preferred to use an ABS resin having a higher glass transition temperature (Tg) obtained by an addition of a component of increasing the glass transition temperature. The increase in glass transition temperature of the ABS resin shifts a starting temperature of thermal deformation of the resin molded article B to the high temperature side. As a result, the shrinkage caused when the resin molded article B is heated decreases, and the heat resistance is improved. As the component of increasing the glass transition temperature of the ABS resin, it is possible to use N-phenylmaleimide and α-methylstyrene, which are available in solo use or simultaneous use. It is preferred that an additive amount of N-phenylmaleimide or α-methylstyrene is within a range of 5 to 20 wt % with respect to the ABS resin. When the additive amount is less than 5 wt %, the increase in glass transition temperature can not be substantially achieved. On the other hand, even if the additive amount exceeds 20 wt %, the effect of increasing the glass transition temperature will be saturated. If anything, deterioration in impact strength may come into a problem.

As described above, in the case of adding N-phenylmaleimide or α-methylstyrene to the ABS resin, it is needed to uniformly disperse the N-phenylmaleimide or α-methylstyrene in the ABS resin to efficiently increase the glass transition temperature. As a method of adding N-phenylmaleimide or α-methylstyrene to the ABS resin, there is a method of blending a copolymer of acrylonitrile, styrene and N-phenylmaleimide or α-methylstyrene with a graft copolymer obtained by polymerizing acrylonitrile and styrene in the presence of a polybutadiene latex. In the thus obtained ABS resin, since N-phenylmaleimide or α-methylstyrene rich regions are generated, the effect of increasing the glass transition temperature of the ABS resin can not be highly obtained. In addition, since the N-phenylmaleimide or α-methylstyrene rich regions are hard to draw out by the rolling, effects of improving physical properties by the rolling are small.

To uniformly disperse N-phenylmaleimide or α-methylstyrene in the ABS resin, it is preferred to prepare the ABS resin, as described below. First, a graft copolymer is prepared by polymerizing acrylonitrile, styrene and N-phenylmaleimide or α-methylstyrene, and if necessary other additive(s) in a polybutadiene latex. On the other hand, a copolymer is prepared by polymerizing acrylonitrile, styrene and N-phenylmaleimide or α-methylstyrene, and if necessary other additive(s). Subsequently, the graft copolymer is blended with the copolymer in a molten state to obtain the ABS resin, in which N-phenylmaleimide or α-methylstyrene is uniformly dispersed. In this case, N-phenylmaleimide or α-methylstyrene is uniformly dispersed in the matrix phase 3 that is the copolymer of acrylonitrile and styrene.

To increase the glass transition temperature and improve the heat resistance of the ABS resin, it is also preferred that the ABS resin is alloyed with a resin material having a glass transition temperature higher than the ABS resin. As the resin material having the higher glass transition temperature and alloyable with the ABS resin, there are polycarbonate (PC), polybutylene terephthalate (PBT) or the like. Since an ABS/PBT polymer alloy obtained by compounding the ABS resin with polybutylene terephthalate contains a crystallized PBT component, it is not suitable for rolling. On the other hand, an ABS/PC polymer alloy obtained by compounding the ABS resin with polycarbonate shows good rolling property. Therefore, it is particularly preferred to use the ABS resin alloyed with polycarbonate in the present invention.

To reduce the shrinkage caused when the resin molded article B is heated, it is preferred that a heat treatment is performed at a temperature between the glass transition temperature of the resin molded article B, at which Young's modulus rapidly decreases, and a temperature determined by subtracting 30° C. from the glass transition temperature (glass transition temperature −30° C.) under a condition that the resin molded article B is secured to prevent dimensional change.

When the resin molded article B has a deformation such as warping or waving, the deformation can be repaired by this heat treatment. To secure the resin molded article B during the heat treatment, for example, both sides of the resin molded article B in the rolling direction may be clamped. It is preferred to carry out the heat treatment for 2 minutes or more. When the treatment time is less than 2 minutes, there is a fear that sufficient effects may not be obtained. An upper limit of the heating time is not specifically limited. However, even if the treatment is continued for more than 60 minutes, further effects can not be expected.

The resin preferable for this heat treatment comprises HI-PS resin (High Impact Polystyrene) and polycarbonate resin as well as ABS resin and AAS resin. In the case of using the ABS resin, it is possible to use an ABS resin containing N-phenylmaleimide or α-methylstyrene, or an ABS resin alloyed with polycarbonate to obtain remarkable effects of the heat treatment. In addition, when using the ABS resin containing 5 to 30 wt % of the polybutadiene component (rubber component), the remarkable effects of the heat treatment can be achieved.

As an example, by performing extrusion molding with respect to each of an ABS resin containing 5 to 30 wt % of N-phenylmaleimide, ABS resin containing 5 wt % of the rubber component, ABS resin containing 30 wt % of the rubber component, and an HI-PS resin, primary molded articles A were produced. Then, the primary molded articles A were rolled to obtain resin molded articles B. With respect to each of the resin molded articles B, heat treatments were performed under conditions shown in Table 1, while both sides of the resin molded article in the rolling direction being secured by a clamp. After the heat treatment, a shrinkage percentage of the resin molded article B was measured. For comparison, the shrinkage percentage of the resin molded article B without the heat treatment was also measured. The shrinkage percentage was determined by keeping the resin molded article B for 24 hours at 80° C. in a thermostatic chamber and measuring a dimensional change before and after the heat treatment. Results are shown in Table 1. These results demonstrate that the heat treatment brings a reduction in shrinkage percentage to improve the heat resistance. In addition, warping or waving of the resin molded article B was eliminated.

TABLE 1

| Type of Resin | Shrinkage percentage (%) | | Heat-treatment conditions |
|---|---|---|---|
| | no Heat treatment | Heat treatment | |
| ABS resin containing 5 to 30 wt % of N-phenylmaleimide ABS resin | 3–6% | 0.3–2% | 90–120° C., 5 min or more |
| Rubber component: 5% | 2–3% | 0.5–1% | 70–100° C., |
| Rubber component: 30% | 4–5% | 1–2% | 5 min or more |
| HI-PS resin | 3–5% | 1–2% | 70–100° C., 5 min or more |

EXAMPLES

The present invention is concretely explained according to the following Examples. However, these Examples do not limit the scope of the invention.

Example 1

Extrusion molding of ABS resin pellets ("Toyolac 600" manufactured by Toray Industries, Inc.) was performed at an extrusion molding temperature of 200° C. to obtain a primary molded article A having a thickness of 2.5 mm. A glass transition temperature of the ABS resin of the primary molded article A is approximately 110° C., which was measured by use of a visco-elastic spectrometer.

Next, the primary molded article A was heated at 110° C., and rolled by allowing it to pass through a clearance between a pair of temperature-controlled reduction rolls 1. At this time, the rolling of the primary molded article A was performed under a condition that a required tensile stress is applied thereto. After the rolling, the thus obtained resin molded article B was cooled by cold blast. A thickness of the resin molded article B is 1 mm.

Elastic modulus and coefficient of linear expansion of this resin molded article B were measured according to ASTM D790 and ASTM D696, respectively. Results are shown in Table 2.

Figure 5A:
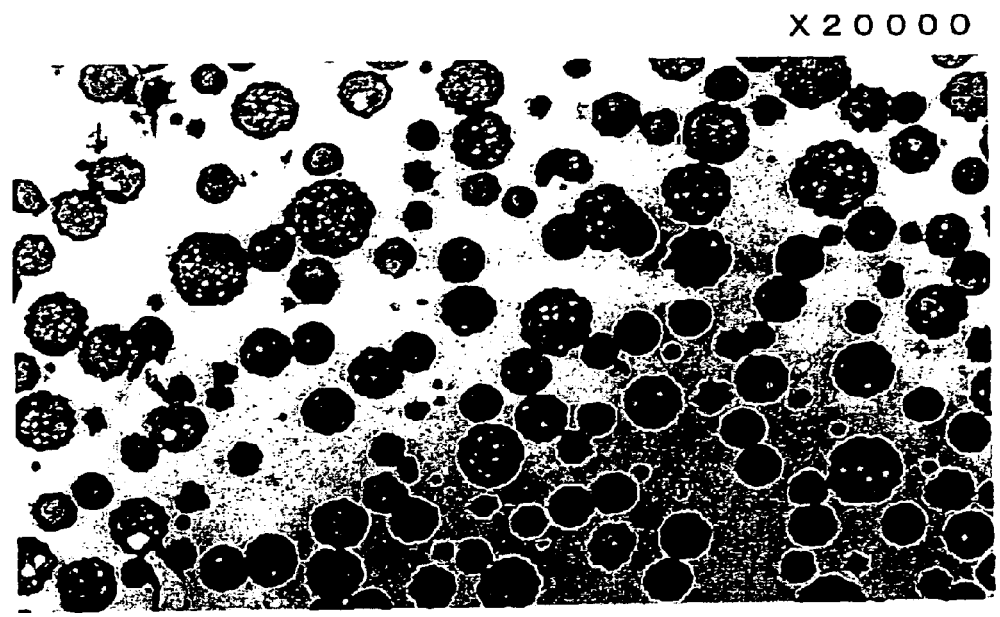
FIGS. 5A and 5B are respectively electron microscope photographs of the resin structures before and after rolling according to the preferred embodiment of the present invention.
Figure 5B:

In Examples explained below, the elastic modulus and the coefficient of linear expansion were measured by the same manner. An electron microscope photograph of a cutting surface of the resin molded article B in the rolling direction is shown in FIG. 5A. For comparison, the elastic modulus and the coefficient of linear expansion of the primary molded article A before the rolling were measured. Results are also shown as a Comparative Example 1 in Table 2. In addition, FIG. 5B shows an electron microscope photograph of a cutting surface of the primary molded article A in the rolling direction.

TABLE 2

| | Example 1 | Comparative Example 1 |
|---|---|---|
| Glass transition temperature of ABS resin (° C.) | 110 | 110 |
| Molding conditions | | |
| Resin thickness before rolling (mm) | 2.5 | 2.5 |
| Resin temperature before rolling (° C.) | 110 | — |
| Roll temperature (° C.) | 110 | — |
| Resin thickness after rolling (mm) | 1 | — |
| rolling magnification | 2.5 | — |
| Physical properties | | |
| Elastic modulus (GPa) | 3 | 2 |
| Coefficient of linear expansion ($10^{-5}$/° C.) | 4 | 9 |
| Exterior appearance | ○ | ○ |

As shown in FIG. 5A, the primary molded article A has a spherical dispersion phase of polybutadiene, which is dispersed in a matrix phase 3 of a copolymer of acrylonitrile and styrene. However, as shown in FIG. 5B, the dispersion phase 2 is deformed in a planular shape in the thickness direction and an elongated ellipse shape in the rolling direction by the rolling, so that this elliptic dispersion phase is oriented such that its longitudinal direction is parallel to the rolling direction. From the electron microscope photograph of FIG. 5A, a maximum length in the rolling direction of the dispersion phase 2 is more than two times of the maximum length in the thickness direction thereof. Moreover, as shown in Table 2, the resin molded article B of Example 1 has a higher elastic modulus and a smaller coefficient of linear expansion than the primary molded article A of Comparative Example 1.

Examples 2 to 9

Extrusion molding of ABS resin pellets ("Toyolac 600" manufactured by Toray Industries, Inc.) was performed at an extrusion molding temperature of 200° C. to obtain primary molded articles A having thicknesses of 2.5 to 12.5 mm.

Next, each of the primary molded articles A was rolled under a condition shown in Table 3. For example, one of the primary molded articles A was rolled by allowing it to pass through a clearance between a pair of reduction rolls controlled at 80° C. In this case, the rolling of the primary molded article A was performed under a condition that a required tensile stress is applied thereto. After the rolling, the thus obtained resin molded article B was cooled by cold blast. A thickness of the resin molded article B is 2 mm.

With respect to each of the resin molded articles B of the Examples 2 to 9, the elastic modulus and the coefficient of linear expansion were measured. Results are shown in Table 3. For comparison, those properties of the primary molded article A before the rolling are also shown as Comparative Example 2 in Table 3. Each of the resin molded articles B of Examples 2 to 9 has a higher elastic modulus and a smaller coefficient of linear expansion than the primary molded article A of Comparative Example 2.

TABLE 3

|  | Examples | | | | | | | | Comparative |
|  | 2 | 3 | 4 | 5 | 6 | 7 | 8 | 9 | Example 2 |
|---|---|---|---|---|---|---|---|---|---|
| Glass transition temperature of ABS resin (° C.) | 110 | 110 | 110 | 110 | 110 | 110 | 110 | 110 | 110 |
| Molding conditions | | | | | | | | | |
| Resin thickness before rolling (mm) | 2.5 | 2.5 | 2.5 | 7.5 | 12.5 | 12.5 | 2.5 | 2.5 | 2.5 |
| Resin Temperature before rolling (° C.) | 110 | 110 | 110 | 110 | 110 | 110 | 70 | 160 | — |
| Roll temperature (° C.) | 80 | 80 | 80 | 80 | 80 | 80 | 50 | 100 | — |
| Resin thickness after rolling (mm) | 2 | 1 | 0.5 | 3 | 5 | 10 | 1 | 1 | — |
| Rolling magnification | 1.25 | 2.5 | 5 | 2.5 | 2.5 | 1.25 | 2.5 | 2.5 | — |
| Physical properties | | | | | | | | | |
| Elastic modulus (GPa) | 2.5 | 3 | 3 | 3 | 3 | 2.5 | 3 | 2.5 | 2 |
| Coefficient of linear expansion ($10^{-5}$/° C.) | 6 | 3 | 2 | 3 | 4 | 6 | 2.5 | 4 | 9 |
| Exterior appearance | ○ | ○ | ○ | ○ | ○ | ○ | ○ | ○ | ○ |

Examples 10 and 11

Extrusion molding of ABS resin pellets ("Toyolac 600" manufactured by Toray Industries, Inc.) was performed at an extrusion molding temperature of 200° C. to obtain primary molded articles A having the thickness of 2.5 mm.

Next, each of the primary molded articles A was heated at 110° C., and then rolled by allowing it pass through a clearance between a pair of reduction rolls temperature-controlled at 80° C. In this case, the rolling of the primary molded article A was performed under a condition that a required tensile stress is applied thereto, and then it was cooled by cold blast to obtain a resin molded article B having the thickness of 1 mm. The molding conditions of Example 10 and 11 are the same as them of Example 3 shown in Table 3. In Example 10, the resin molded article B was heat-treated at 70° C. for 60 minutes and then cooled by cold blast. In Example 11, the resin molded article B was heat-treated at 90° C. for 5 minutes and then cooled by cold blast.

With respect to each of the resin molded articles B of Examples 10 and 11, the elastic modulus and the coefficient of linear expansion were measured according to ASTM D696. Results are shown in Table 4. Each of the resin molded articles of Examples 10 and 11 has a further improved elastic modulus as compared with the molded article of Example 3 without the heat treatment.

TABLE 4

|  | Example 10 | Example 11 |
|---|---|---|
| Glass transition temperature of ABS resin (° C.) | 110 | 110 |
| Molding conditions | | |
| Resin thickness before rolling (mm) | 2.5 | 2.5 |
| Resin temperature before rolling (° C.) | 110 | 110 |
| Roll temperature (° C.) | 80 | 80 |
| Resin thickness after rolling (mm) | 1 | 1 |
| rolling magnification | 2.5 | 2.5 |
| Heat treatment | | |
| Heat treatment temperature (° C.) | 70 | 90 |
| Heat treatment time (min) | 60 | 5 |

TABLE 4-continued

|  | Example 10 | Example 11 |
|---|---|---|
| Physical properities | | |
| Elastic modulus (GPa) | 5 | 5.5 |
| Coefficient of linear expansion ($10^{-5}$/° C.) | 3 | 3 |
| Exterior appearance | ○ | ○ |

Example 12

Two-layer extrusion molding of ABS resin pellets ("Toyolac 600" manufactured by Toray Industries, Inc.) and AAS resin pellets ("VITAX V6700" manufactured by Hitachi Chemical Co. Ltd.) was performed at an extrusion molding temperature of 200° C. to obtain a primary molded article A having the thickness of 2.5 mm, which is of a laminate structure of an ABS-resin layer having the thickness of 2.0 mm and an AAS-resin coating layer 4 having the thickness of 0.5 mm formed on the ABS-resin layer.

Then, the primary molded article A was heated at 110° C., at which the ABS and AAS resins become soft, but flowage does not happen. Then, the molded article was rolled by allowing it to pass through a clearance between a pair of reduction rolls temperature-controlled at 80° C. In this case, the rolling of the primary molded article A was carried out under a condition that a required tensile stress is applied thereto. After the rolling, the thus obtained resin molded article B was cooled by cold blast. A thickness of the resin molded article B is 1 mm.

The elastic modulus and the coefficient of linear expansion of the resin molded article B of Example 12 were measured. In addition, a weathering resistance test was performed for 500 hours by use of a sunshine weather meter, and then a color difference (ΔE) between before and after the weathering resistance test was determined by use of a color-difference meter. For comparison, a molded article (Comparative Example 3 having the thickness of 1 mm was prepared by the two-layer extrusion molding of ABS and AAS resins, which is composed of an ABS resin layer having the thickness of 0.8 mm and an AAS resin layer having the thickness of 0.2 mm. In addition, a molded article (Comparative Example 4 having the thickness of 1 mm was prepared by extrusion molding of only the ABS resin. With respect to each of these molded articles, the elastic modulus and the coefficient of linear expansion were measured, and the color difference was determined according to results of the weathering resistance test. Results are shown in Table 5.

TABLE 5

|  | Example 12 | Comparative Example 3 | Comparative Example 4 |
|---|---|---|---|
| Glass transition temperature of ABS resin (° C.) | 110 | 110 | 110 |
| Molding conditions |  |  |  |
| Resin thickness before rolling (mm) | 2.5(0.5) | 1(0.2) | 1 |
| Resin temperature before rolling (° C.) | 110 | — | — |
| Roll temperature (° C.) | 80 | — | — |
| Resin thickness after rolling (mm) | 1(0.2) | — | — |
| rolling magnification | 2.5 | — | — |
| Physical properties |  |  |  |
| Elastic modulus (GPa) | 3 | 2 | 2 |
| Coefficient of linear expansion ($10^{-5}$/° C.) | 2.5 | 9 | 9 |
| Weathering resistance (ΔE) | 2.5 | 3.8 | 11.5 |

*( ) designates a thickness of the coating layer.

Example 13

Extrusion molding of ABS resin pellets ("Toyolac 600" manufactured by Toray Industries, Inc.) was performed at an extrusion molding temperature of 200° C. to obtain a primary molded article A having the thickness of 2.5 mm. Next, this primary molded article A was heated at 110° C., and then rolled by allowing it to pass through a clearance between a pair of reduction rolls temperature-controlled at 80° C., each of which has a peripheral mirror surface. In this case, the rolling of the primary molded article A was carried out under a condition that a required tensile stress is applied thereto. After the rolling, the thus obtained resin molded article B was cooled by cold blast. A thickness of the resin molded article B is 1 mm.

Example 14

Two-layer extrusion molding of ABS resin pellets ("Toyolac 600" manufactured by Toray Industries, Inc.) and AAS resin pellets ("VITAX V6700" manufactured by Hitachi Chemical Co. Ltd.) was performed at an extrusion molding temperature of 200° C. to obtain a primary molded article A having the thickness of 2.5 mm, which is of a laminate structure of an ABS-resin layer having the thickness of 2.0 mm and an AAS-resin coating layer 4 having the thickness of 0.5 mm formed on the ABS-resin layer. Next, this primary molded article A was heated at 110° C., and then rolled by allowing it to pass through a clearance between a pair of reduction rolls temperature-controlled at 80° C., each of which has a peripheral mirror surface. In this case, the rolling of the primary molded article A was carried out under a condition that a required tensile stress is applied thereto. After the rolling, the thus obtained resin molded article B was cooled by cold blast. A thickness of the resin molded article B is 1 mm.

Example 15

A resin molded article of Example 15 was produced according to substantially the same method as Example 13 except for using a reduction roll 1 having a satin finished peripheral surface.

Example 16

A resin molded article of Example 16 was produced according to substantially the same method as Example 14 except for using a reduction roll 1 having a satin finished peripheral surface.

With respect to each of the resin molded articles B of Examples 13 to 16, a degree of surface gloss was measured by a gloss checker (manufactured by Horiba, Ltd.). For comparison, with respect to each of the primary molded article A (Comparative Example 5) of the ABS resin having the thickness of 2.5 mm obtained in Example 13 and the primary molded article A (Comparative Example 6) having the AAS resin coating layer 4 on the ABS resin layer obtained in Example 14, the degree of surface gloss was measured. Results are shown in Table 6.

TABLE 6

|  | Example 13 | Example 14 | Example 15 | Example 16 | Comparative Example 5 | Comparative Example 6 |
|---|---|---|---|---|---|---|
| Glass transition temperature of ABS resin (° C.) | 110 | 110 | 110 | 110 | 110 | 110 |
| Molding conditions |  |  |  |  |  |  |
| Resin thickness before rolling (mm) | 2.5 | 2.5(0.5) | 2.5 | 2.5(0.5) | 2.5 | 2.5(0.5) |
| Resin temperature before rolling (° C.) | 110 | 110 | 110 | 110 | — | — |
| Roll temperature (° C.) | 80 | 80 | 80 | 80 | — | — |
| Roll surface | mirror surface | mirror surface | satin finished surface | satin finished surface | — | — |
| Resin thickness after rolling (mm) | 1 | 1(0.2) | 1 | 1(0.2) | — | — |
| Rolling magnification | 2.5 | 2.5 | 2.5 | 2.5 | — | — |
| Surface gloss | 80 | 80 | 3 | 2 | 60 | 65 |

*( ) designates a thickness of the coating layer.

Examples 17 to 25

Extrusion molding of AAS resin pellets ("VITAX V6700" manufactured by Hitachi Chemical Co. Ltd.) was performed at an extrusion molding temperature of 200° C. to obtain primary molded articles A having thicknesses shown in Table 7. A glass transition temperature of the AAS resin of the primary molded article A is approximately 110° C., which was measured by use of a visco-elastic spectrometer.

Next, each of the primary molded articles A was heated at a temperature shown in Table 7, and rolled by allowing it to pass through a clearance between a pair of reduction rolls 1 controlled at a temperature of 60 to 110° C., as shown in Table 7. In this case, the rolling of the primary molded article A was carried out under a condition that a required tensile stress is applied thereto. After the rolling, the thus obtained resin molded article B was cooled by cold blast. A thickness of the resin molded article B is shown in Table 7.

With respect to each of the resin molded articles B of Examples 17 to 25, the elastic modulus and the coefficient of linear expansion were measured. Results are shown in Table 7. For comparison, these properties of the primary molded article A having the thickness of 2 mm before the rolling were also measured, and shown as Comparative Example 7 in Table 7. The results of Table 7 show that each of the resin molded articles B of Examples 17 to 25 has a higher elastic modulus and a lower coefficient of linear expansion as compared with them of Comparative Example 7.

Example 27

A resin molded article B of Example 27 was produced according to substantially the same method as Example 26 other than performing the blending step at the weight ratio of (a):(b)=1:5 to obtain an ABS resin containing 10 wt % of polybutadiene.

Example 28

A resin molded article B of Example 28 was produced according to substantially the same method as Example 26 other than performing the blending step at the weight ratio of (a):(b)=1:3 to obtain an ABS resin containing 15 wt % of polybutadiene.

Example 29

A resin molded article B of Example 29 was produced according to substantially the same method as Example 26 other than performing the blending step at the weight ratio of (a):(b)=1:14 to obtain an ABS resin containing 4 wt % of polybutadiene.

Example 30

A resin molded article B of Example 30 was produced according to substantially the same method as Example 26

TABLE 7

|  | Examples | | | | | | | | | Comparative |
| --- | --- | --- | --- | --- | --- | --- | --- | --- | --- | --- |
|  | 17 | 18 | 19 | 20 | 21 | 22 | 23 | 24 | 25 | Example 7 |
| Glass transition temperature of ABS resin (° C.) | 110 | 110 | 110 | 110 | 110 | 110 | 110 | 110 | 110 | 110 |
| Molding conditions | | | | | | | | | | |
| Resin thickness before rolling (mm) | 5 | 5 | 5 | 5 | 5 | 5 | 5 | 10 | 10 | 2 |
| Resin temperature before rolling (° C.) | 130 | 170 | 90 | 130 | 130 | 130 | 130 | 130 | 130 | — |
| Roll temperature (° C.) | 90 | 90 | 90 | 110 | 60 | 90 | 90 | 90 | 90 | — |
| Resin thickness after rolling (mm) | 2 | 2 | 2 | 2 | 2 | 1 | 4 | 2 | 8 | — |
| Rolling magnification | 2.5 | 2.5 | 2.5 | 2.5 | 2.5 | 5 | 1.25 | 5 | 1.25 | — |
| physical properties | | | | | | | | | | |
| Elastic modulus GPa | 4.5 | 4.5 | 4.5 | 4 | 5 | 5.5 | 4 | 5.5 | 4 | 2 |
| Coefficient of linear expansion ($10^{-5}$/° C.) | 3 | 3 | 3 | 6 | 2 | 2 | 6 | 2 | 6 | 9 |

Example 26

Emulsion polymerization was performed by adding 40 parts by weight of a mono-polymer mixture composed of 30 parts by weight of acrylonitrile and 70 parts by weight of styrene to 60 parts by weight on a solid basis of polybutadiene latex having a gel content of 80 wt %, to thereby obtain a powder-like graft copolymer (a). On the other hand, a powder-like copolymer (b) was prepared by emulsion polymerization of a monomer mixture composed of 30 parts by weight of acrylonitrile and 70 parts by weight of styrene. The graft copolymer (a) was blended with the graft copolymer (b) at a weight ratio of (a):(b)=1:11. Then, melting, extrusion molding and grinding were performed to obtain an ABS resin containing 5 wt % of polybutadiene.

Extrusion molding of this ABS resin was performed at an extrusion molding temperature of 200° C. to obtain a primary molded article A having the thickness of 2.5 mm. Next, this primary molded article A was heated at 110° C., and then rolled by allowing it to pass through a clearance between a pair of reduction rolls 1 temperature-controlled at 110° C., to thereby obtain a resin molded article B having the thickness of 1 mm.

other than performing the blending step at the weight ratio of (a):(b)=1:2 to obtain an ABS resin containing 20 wt % of polybutadiene.

With respect to each of the thus obtained resin molded articles B of Examples 26 to 30, IZOD impact value was measured according to ASTM-D698 (with notch), and a shrinkage caused by heating was measured. The shrinkage percentage was determined by heating the resin molded article B at 80° C. for 24 hours in a thermostatic chamber, measuring sizes $L_0$, $L_1$ of the molded article before and after the heating at the room temperature of 25° C., and substituting these sizes into an equation of "shrinkage percentage (%)=$(L_0-L_1)/L_0 \times 100$". Results are shown in Table 8.

As shown in Table 8, when using the ABS resin containing 5 to 15 wt % of polybutadiene, excellent heat resistance and reduced shrinkage can be achieved without deteriorating the impact resistance.

TABLE 8

| Physical properties | Unit | Example 26 | Example 27 | Example 28 | Example 29 | Example 30 |
|---|---|---|---|---|---|---|
| IZOD impact value | J/m | 220 | 230 | 250 | 190 | 260 |
| Shrinkage percentage (rolling direction) | % | 2 | 2.5 | 3 | 1 | 5 |

TABLE 9

| Physical properties | Unit | Examples | | | | | | | | | | |
|---|---|---|---|---|---|---|---|---|---|---|---|
| | | 31 | 32 | 33 | 34 | 35 | 36 | 37 | 38 | 39 | 40 | 41 |
| IZOD impact value | J/m | 250 | 240 | 220 | 240 | 240 | 210 | 280 | 260 | 190 | 250 | 170 |
| Shrinkage Percentage (rolling direction) | % | 3 | 2 | 1 | 3 | 3 | 1 | 5 | 5 | 1 | 5 | 1 |

Example 31

Emulsion polymerization was performed by adding 40 parts by weight of a mono-polymer mixture composed of 30 parts by weight of acrylonitrile and 70 parts by weight of styrene to 60 parts by weight on a solid basis of polybutadiene latex having a gel content of 80 wt %, to thereby obtain a powder-like graft copolymer (a). On the other hand, a powder-like copolymer (b) was prepared by emulsion polymerization of a monomer mixture composed of 30 parts by weight of acrylonitrile, 70 parts by weight of styrene and 11 parts by weight of N-phenylmaleimide. The graft copolymer (a) was blended with the graft copolymer (b) at a ratio of 90 parts by weight of (b) with respect to 100 parts by weight of (a). Then, melting, extrusion molding and grinding were performed to obtain ABS resin pellets containing 5 wt % of N-phenylmaleimide.

Extrusion molding of this ABS resin was performed at an extrusion molding temperature of 200° C. to obtain a primary molded article A having the thickness of 3 mm. Next, this primary molded article A was heated at 110° C., and then rolled by allowing it to pass through a clearance between a pair of reduction rolls 1 temperature-controlled at 110° C., to thereby obtain a resin molded article B having the thickness of 1 mm.

Example 32

A powder-like copolymer (c) obtained by emulsion polymerization of a monomer mixture composed of 30 parts by weight of acrylonitrile, 70 parts by weight of styrene and 25 parts by weight of N-phenylmaleimide was blended with the graft copolymer (a) obtained in Example 31 at a ratio of 80 parts by weight of (c) with respect to 100 parts by weight of (a). Then, melting, extrusion molding and grinding were performed to obtain ABS resin pellets containing 10 wt % of N-phenylmaleimide. A resin molded article B of Example 32 was produced according to substantially the same method as Example 31 other than the above procedures.

Example 33

A powder-like copolymer (d) obtained by emulsion polymerization of a monomer mixture composed of 30 parts by weight of acrylonitrile, 70 parts by weight of styrene and 66 parts by weight of N-phenylmaleimide was blended with the graft copolymer (a) obtained in Example 31 at a ratio of 60 parts by weight of (d) with respect to 100 parts by weight of (a). Then, melting, extrusion molding and grinding were performed to obtain ABS resin pellets containing 20 wt % of N-phenylmaleimide. A resin molded article B of Example 33 was produced according to substantially the same method as Example 31 other than the above procedures.

Example 34

A powder-like copolymer (e) obtained by emulsion polymerization of a monomer mixture composed of 30 parts by weight of acrylonitrile, 70 parts by weight of styrene and 11 parts by weight of α-methylstyrene was blended with the graft copolymer (a) obtained in Example 31 at a ratio of 90 parts by weight of (e) with respect to 100 parts by weight of (a). Then, melting, extrusion molding and grinding were performed to obtain ABS resin pellets containing 5 wt % of α-methylstyrene. A resin molded article B of Example 34 was produced according to substantially the same method as Example 31 other than the above procedures.

Example 35

A powder-like copolymer (f) obtained by emulsion polymerization of a monomer mixture composed of 30 parts by weight of acrylonitrile, 70 parts by weight of styrene and 25 parts by weight of α-methylstyrene was blended with the graft copolymer (a) obtained in Example 31 at a ratio of 80 parts by weight of (f) with respect to 100 parts by weight of (a). Then, melting, extrusion molding and grinding were performed to obtain ABS resin pellets containing 10 wt % of α-methylstyrene. A resin molded article B of Example 35 was produced according to substantially the same method as Example 31 other than the above procedures.

Example 36

A powder-like copolymer (g) obtained by emulsion polymerization of a monomer mixture composed of 30 parts by weight of acrylonitrile, 70 parts by weight of styrene and 66 parts by weight of α-methylstyrene was blended with the graft copolymer (a) obtained in Example 31 at a ratio of 60 parts by weight of (g) with respect to 100 parts by weight of (a). Then, melting, extrusion molding and grinding were performed to obtain ABS resin pellets containing 20 wt % of α-methylstyrene. A resin molded article B of Example 36 was produced according to substantially the same method as Example 31 other than the above procedures.

Example 37

A powder-like copolymer (h) obtained by emulsion polymerization of a monomer mixture composed of 30 parts by weight of acrylonitrile and 70 parts by weight of styrene was blended with the graft copolymer (a) obtained in Example 31 at a ratio of 100 parts by weight of (h) with respect to 100 parts by weight of (a). Then, melting, extrusion molding and grinding were performed to obtain ABS resin pellets not containing N-phenylmaleimide and α-methylstyrene. A resin molded article B of Example 37 was produced according to substantially the same method as Example 31 other than the above procedures.

Example 38

A powder-like copolymer (i) obtained by emulsion polymerization of a monomer mixture composed of 30 parts by weight of acrylonitrile, 70 parts by weight of styrene and 8.7 parts by weight of N-phenylmaleimide was blended with the graft copolymer (a) obtained in Example 31 at a ratio of 92 parts by weight of (i) with respect to 100 parts by weight of (a). Then, melting, extrusion molding and grinding were performed to obtain ABS resin pellets containing 4 wt % of N-phenylmaleimide. A resin molded article B of Example 38 was produced according to substantially the same method as Example 31 other than the above procedures.

Example 39

A powder-like copolymer (j) obtained by emulsion polymerization of a monomer mixture composed of 30 parts by weight of acrylonitrile, 70 parts by weight of styrene and 100 parts by weight of N-phenylmaleimide was blended with the graft copolymer (a) obtained in Example 31 at a ratio of 50 parts by weight of (j) with respect to 100 parts by weight of (a). Then, melting, extrusion molding and grinding were performed to obtain ABS resin pellets containing 25 wt % of N-phenylmaleimide. A resin molded article B of Example 39 was produced according to substantially the same method as Example 31 other than the above procedures.

Example 40

A powder-like copolymer (k) obtained by emulsion polymerization of a monomer mixture composed of 30 parts by weight of acrylonitrile, 70 parts by weight of styrene and 8.7 parts by weight of α-methylstyrene was blended with the graft copolymer (a) obtained in Example 31 at a ratio of 92 parts by weight of (k) with respect to 100 parts by weight of (a). Then, melting, extrusion molding and grinding were performed to obtain ABS resin pellets containing 4 wt % of α-methylstyrene. A resin molded article B of Example 40 was produced according to substantially the same method as Example 31 other than the above procedures.

Example 41

A powder-like copolymer (m) obtained by emulsion polymerization of a monomer mixture composed of 30 parts by weight of acrylonitrile, 70 parts by weight of styrene and 100 parts by weight of α-methylstyrene was blended with the graft copolymer (a) obtained in Example 31 at a ratio of 50 parts by weight of (m) with respect to 100 parts by weight of (a). Then, melting, extrusion molding and grinding were performed to obtain ABS resin pellets containing 25 wt % of a methylstyrene. A resin molded article B of Example 41 was produced according to substantially the same method as Example 31 other than the above procedures.

With respect to each of the thus obtained resin molded articles B of Examples 31 to 41, IZOD impact value was measured according to ASTM-D698 (with notch), and a shrinkage caused by heating was measured. The shrinkage percentage was determined by heating the resin molded article B at 80° C. for 24 hours in a thermostatic chamber, measuring sizes $L_0$, $L_1$ of the molded article before and after the heating at the room temperature of 25° C., and substituting these sizes into an equation of "shrinkage percentage (%)=$(L_0-L_1)/L_0 \times 100$". Results are shown in Table 9. To determine the IZOD impact value and the shrinkage percentage in another Examples of this specification, the above-described methods were adopted.

As shown in Table 9, when using the ABS resin containing 5 to 20 wt % of N-phenylmaleimide or α-methylstyrene, the shrinkage caused by heating was reduced by 50 to 80%. Therefore, it is possible to provide excellent heat resistance without deterioration of the impact resistance.

Example 42

Emulsion polymerization was performed by adding 40 parts by weight of a mono-polymer mixture composed of 30 parts by weight of acrylonitrile, 70 parts by weight of styrene and 8 parts by weight of N-phenylmaleimide to 60 parts by weight on a solid basis of polybutadiene latex having a gel content of 80 wt %, to thereby obtain a powder-like graft copolymer (a). On the other hand, a powder-like copolymer (b) was prepared by emulsion polymerization of a monomer mixture composed of 30 parts by weight of acrylonitrile, 70 parts by weight of styrene and 8 parts by weight of N-phenylmaleimide. The graft copolymer (a) was blended with the graft copolymer (b) at a ratio of 90 parts by weight of (b) with respect to 100 parts by weight of (a). Then, melting, extrusion molding and grinding were performed to obtain ABS resin pellets containing 5 wt % of N-phenylmaleimide.

Extrusion molding of this ABS resin was performed at an extrusion molding temperature of 200° C. to obtain a primary molded article A having the thickness of 3 mm. Next, this primary molded article A was heated at 110° C., and then rolled by allowing it to pass through a clearance between a pair of reduction rolls 1 temperature-controlled at 110° C., to thereby obtain a resin molded article B having the thickness of 1 mm.

Example 43

A powder-like copolymer (c) obtained by emulsion polymerization of a monomer mixture composed of 30 parts by weight of acrylonitrile, 70 parts by weight of styrene and 17 parts by weight of N-phenylmaleimide was blended with the graft copolymer (a) obtained in Example 42 at a ratio of 80 parts by weight of (c) with respect to 100 parts by weight of (a). Then, melting, extrusion molding and grinding were performed to obtain ABS resin pellets containing 10 wt % of N-phenylmaleimide. A resin molded article B of Example 43 was produced according to substantially the same method as Example 42 other than the above procedures.

Example 44

A powder-like copolymer (d) obtained by emulsion polymerization of a monomer mixture composed of 30 parts by weight of acrylonitrile, 70 parts by weight of styrene and 40 parts by weight of N-phenylmaleimide was blended with the graft copolymer (a) obtained in Example 42 at a ratio of 80 parts by weight of (d) with respect to 100 parts by weight of (a). Then, melting, extrusion molding and grinding were performed to obtain ABS resin pellets containing 20 wt % of N-phenylmaleimide. A resin molded article B of Example 44 was produced according to substantially the same method as Example 42 other than the above procedures.

Example 45

Emulsion polymerization was performed by adding 40 parts by weight of a mono-polymer mixture composed of 30 parts by weight of acrylonitrile and 70 parts by weight of styrene to 60 parts by weight on a solid basis of polybutadiene latex having a gel content of 80 wt %, to thereby obtain a powder-like graft copolymer (e). On the other hand, a powder-like copolymer (f) was prepared by emulsion polymerization of a monomer mixture composed of 30 parts by weight of acrylonitrile and 70 parts by weight of styrene. The graft copolymer (e) was blended with the graft copolymer (f) at a ratio of 100 parts by weight of (f) with respect to 100 parts by weight of (e). Then, melting, extrusion molding and grinding were performed to obtain ABS resin pellets not containing N-phenylmaleimide.

Extrusion molding of this ABS resin was performed at an extrusion molding temperature of 200° C. to obtain a primary molded article A having the thickness of 3 mm. Next, this primary molded article A was heated at 80° C., and then rolled by allowing it to pass through a clearance between a pair of reduction rolls 1 temperature-controlled at 80° C., to thereby obtain a resin molded article B having the thickness of 1 mm.

Example 46

Emulsion polymerization was performed by adding 40 parts by weight of a mono-polymer mixture composed of 30 parts by weight of acrylonitrile and 70 parts by weight of styrene to 60 parts by weight on a solid basis of polybutadiene latex having a gel content of 80 wt %, to thereby obtain a powder-like graft copolymer (e). On the other hand, a powder-like copolymer (g) was prepared by emulsion polymerization of a monomer mixture composed of 30 parts by weight of acrylonitrile, 70 parts by weight of styrene and 20 parts by weight of N-phenylmaleimide. The graft copolymer (e) was blended with the graft copolymer (g) at a ratio of 100 parts by weight of (g) with respect to 100 parts by weight of (e). Then, melting, extrusion molding and grinding were performed to obtain ABS resin pellets containing 10 wt % of N-phenylmaleimide. A resin molded article B of Example 46 was produced according to substantially the same method as Example 42 other than the above procedures.

With respect to each of the thus obtained resin molded articles B of Examples 42 to 46, elastic modulus, coefficient of linear expansion, IZOD impact value and a shrinkage caused by heating were measured. Results are shown in Table 10.

As shown in Table 10, when using the ABS resin, in which N-phenylmaleimide or α-methylstyrene is uniformly dispersed, it is possible to further improve mechanical properties and heat resistance.

TABLE 10

| Physical properties | Unit | Examples | | | | |
|---|---|---|---|---|---|---|
| | | 42 | 43 | 44 | 45 | 46 |
| Coefficient of linear expansion | ($10^{-5}$/° C.) | 3 | 3 | 3 | 3 | 3.5 |
| Elastic modulus | GPa | 4 | 4 | 4 | 4 | 4 |
| IZOD impact value | J/m | 260 | 250 | 230 | 280 | 180 |
| Shrinkage percentage | % | 2 | 1 | 1 | 5 | 3 |

Example 47

As an ABS resin alloyed with polycarbonate, "Toyolac PX10" (manufactured by Toray Industries, Inc.) was used. Extrusion molding of this resin was performed at an extrusion molding temperature of 200° C. to obtain a primary molded article A having the thickness of 2 mm. Next, this primary molded article A was heated at 110° C., and rolled by allowing it to pass through a clearance between a pair of reduction rolls 1 temperature-controlled at 110° C., to thereby obtain a resin molded article B having the thickness of 0.8 mm.

Example 48

As an ABS resin not containing polycarbonate, "Toyolac 600" (manufactured by Toray Industries, Inc.) was used. Extrusion molding of this resin was performed at an extrusion molding temperature of 200° C. to obtain a primary molded article A having the thickness of 2 mm. Next, this primary molded article A was heated at 80° C., and then rolled by allowing it to pass through a clearance between a pair of reduction rolls 1 temperature-controlled at 80° C., to thereby obtain a resin molded article B having the thickness of 0.8 mm.

With respect to each of the thus obtained resin molded articles B of Examples 38 and 39, a shrinkage caused by heating was measured. Results are shown in Table 11.

As shown in Table 11, the shrinkage caused by heating was reduced to 20% by use of the ABS resin alloyed with polycarbonate. Therefore, the heat resistance can be remarkably improved by use of this ABS resin.

TABLE 11

| | Unit | Example 47 | Example 48 |
|---|---|---|---|
| Shrinkage percentage (rolling direction) | % | 1 | 5 |

Example 49

Extrusion molding of an ABS resin having a glass transition temperature of 100° C. was performed at an extrusion molding temperature of 200° C. to obtain primary molded articles A having the thickness of 3 mm. Next, the primary molded articles A were heated at 80° C., and rolled by allowing them to pass through a clearance between a pair of reduction rolls 1 temperature-controlled at 80° C., to thereby obtain resin molded articles B having the thickness of 1 mm.

After opposite ends in the rolling direction of the respective resin molded article B were clamped, heat treatments were performed by use of a thermostatic chamber at different temperatures of 60° C., 70° C. and 100° C. for different time periods of 2 min, 5 min, 30 min and 60 min, as shown in Table 12. With respect to each of the heat-treated resin molded articles, a shrinkage caused by heating was measured. Results are shown in Table 12.

TABLE 12

| Heat treatment temperature | Heat treatment time | | | | |
|---|---|---|---|---|---|
| | 0 min (No heat treatment) | 2 min | 5 min | 30 min | 60 min |
| 60° C. | 5% | — | — | 5% | — |
| 70° C. | 5% | 4% | 3.5% | 3% | 2% |
| 100° C. | 5% | 4% | 3% | 1% | 1% |

As shown in Table 12, the resin molded articles heat-treated at 70° C. and 100° C. for 2 min or more are smaller in shrinkage percentage than the resin molded articles without the heat treatment. This means that the heat resistance is further improved by the heat treatment. However, when the resin molded article was heat-treated at 60° C., the shrinkage percentage was not improved. Therefore, these results suggest that it is preferred to perform the heat treatment for 2 min or more at a temperature higher than a temperature determined by subtracting 30° C. from the glass transition temperature.

Industrial Applicability

Thus, according to the present invention, since a resin molded article is produced by performing extrusion molding of a thermoplastic amorphous resin such as ABS resin and AAS resin, and then rolling, it is possible to provide the resin molded article having an increased elastic modulus and a reduced coefficient of linear expansion. Therefore, the resin molded article having a high degree of reliability in rigidity and dimensional stability is suitable for applications requiring an elongated form such as gutters as well as popular applications of automobile parts, electric appliances, housing members and so on. In addition, when a heat treatment is performed under a required condition after the rolling, it is possible to reduce shrinkage caused when the molded article is heated, and therefore provide the resin molded article having further improved heat resistance.

What is claimed is:

1. A resin molded article produced by performing extrusion molding of a thermoplastic amorphous resin containing a dispersion phase, and then rolling so that said dispersion phase is drawn out in a rolling direction, wherein said resin molded article has a coefficient of linear expansion of 2 to $6 \times 10^{-5}/°$ C.

2. The resin molded article as set forth in claim 1, wherein said thermoplastic amorphous resin is at least one of ABS resin and AAS resin.

3. The resin molded article as set forth in claim 1, wherein said thermoplastic amorphous resin is an ABS resin containing 5 to 30 wt % of polybutadiene.

4. The resin molded article as set forth in claim 1, wherein said thermoplastic amorphous resin is an ABS resin containing a component of increasing its glass-transition temperature.

5. The resin molded article as set forth in claim 4, wherein said thermoplastic amorphous resin is an ABS resin containing 5 to 20 wt % of N-phenylmaleimide as the component of increasing the glass-transition temperature.

6. The resin molded article as set forth in claim 5, wherein said ABS resin is obtained by polymerizing acrylonitrile, styrene and N-phenylmaleimide in a polybutadiene latex to prepare a graft copolymer, polymerizing acrylonitrile, styrene and N-phenylmaleimide to prepare a copolymer, and blending the graft copolymer with the copolymer in a molten state.

7. The resin molded article as set forth in claim 4, wherein said thermoplastic amorphous resin is an ABS resin containing 5 to 20 wt % of a-methylstyrene as the component of increasing the glass-transition temperature.

8. The resin molded article as set forth in claim 7, wherein said ABS resin is obtained by polymerizing acrylonitrile, styrene and α-methylstyrene in a polybutadiene latex to prepare a graft copolymer, polymerizing acrylonitrile, styrene and α-methylstyrene to prepare a copolymer, and blending the graft copolymer with the copolymer in a molten state.

9. The resin molded article as set forth in claim 1, wherein said thermoplastic amorphous resin is an ABS resin alloyed with polycarbonate.

10. The resin molded article as set forth in claim 1, wherein a maximum length in the rolling direction of said dispersion phase after the rolling is more than two times of a maximum thickness in a direction substantially perpendicular to the rolling direction of said dispersion phase after the rolling.

11. A resin molded article produced by performing extrusion molding of a thermoplastic amorphous resin, and then rolling, wherein said resin molded article has a coefficient of linear expansion of 2 to $6 \times 10^{-5}/°$ C., and an elastic modulus of 2.5 GPa or more.

12. The resin molded article as set forth in claim 11, wherein said thermoplastic amorphous resin contains a dispersion phase, and said dispersion phase is drawn out in a rolling direction.

* * * * *